(12) United States Patent
Satran et al.

(10) Patent No.: US 6,607,334 B2
(45) Date of Patent: Aug. 19, 2003

(54) CUTTING INSERT

(75) Inventors: Amir Satran, Kfar Vradim (IL); Daniel Ulianitsky, Maalot-Tarshiha (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 10/053,564

(22) Filed: Jan. 24, 2002

(65) Prior Publication Data

US 2002/0098048 A1 Jul. 25, 2002

(30) Foreign Application Priority Data

Jan. 25, 2001 (IL) ................................................. 141089

(51) Int. Cl.[7] ............................. B23B 27/22; B23C 5/20
(52) U.S. Cl. ......................................... 407/35; 407/113
(58) Field of Search ................................ 407/113, 114, 407/115, 116, 117

(56) References Cited

U.S. PATENT DOCUMENTS

| | | | | |
|---|---|---|---|---|
| 4,297,058 A | * | 10/1981 | Armbrust et al. | 407/113 |
| 4,930,945 A | * | 6/1990 | Arai et al. | 407/42 |
| 5,052,863 A | * | 10/1991 | Satran | 407/113 |
| 5,244,318 A | * | 9/1993 | Arai et al. | 407/42 |
| 5,365,805 A | * | 11/1994 | Pantzar et al. | 407/114 |
| 5,421,679 A | * | 6/1995 | Pantzar et al. | 407/114 |
| 5,441,370 A | * | 8/1995 | Pantzar et al. | 407/113 |
| 5,597,271 A | * | 1/1997 | Men et al. | 407/113 |
| 5,685,670 A | * | 11/1997 | Satran | 407/42 |
| 5,718,540 A | * | 2/1998 | Satran et al. | 407/42 |
| 5,951,212 A | * | 9/1999 | Emoto et al. | 407/34 |
| 5,971,672 A | * | 10/1999 | Hansson | 407/114 |
| 6,126,366 A | | 10/2000 | Lundblad | 407/102 |
| 6,146,063 A | * | 11/2000 | Ramold et al. | 407/113 |

* cited by examiner

*Primary Examiner*—A. L. Wellington
*Assistant Examiner*—Dana Ross
(74) *Attorney, Agent, or Firm*—Womble Carlyle

(57) ABSTRACT

The present invention provides a replaceable cutting insert for use in a cutting tool. The cutting insert has a recess with flat and non-coplanar side surfaces on either side of the recess. The cutting insert is retained in an insert pocket of the cutting tool by three-point contact between contact edges of the pocket and points on the side edges of the recesses on two adjacent side surfaces of the insert.

23 Claims, 5 Drawing Sheets

CUTTING INSERT

FIELD OF THE INVENTION

This invention relates to a supporting arrangement for replaceable cutting inserts for use in cutting tools for metal machining in milling, drilling and turning operations.

BACKGROUND OF THE INVENTION

A major problem in the design of cutting tools in which a replaceable cutting insert is retained in an insert pocket, is the accuracy with which the location of an operative cutting edge of the cutting insert can be determined. For cutting inserts that are generally square, rectangular or diamond shaped, the insert pocket has an overall corresponding shape and comprises a base support wall and two adjacent side support walls that extend generally perpendicular from the base support wall. Since insert pockets are machined in the toolholders the surface flatness of the support walls of the insert pocket are sufficiently accurate. On the other hand, cutting inserts are not always produced with the same degree of accuracy as the insert pockets. This is particularly true for cemented carbide inserts for metal cutting that are made by pressing and sintering carbide powders. During the sintering process the cutting inserts shrink in a manner that is not absolutely determinable. In other words the cutting inserts become distorted to a certain degree and the surfaces of the sintered cutting insert will generally not have the required flatness. Since three adjacent surfaces, two side surfaces and a bottom surface, of the cutting insert, abut the side support walls and the base support wall of the insert pocket, the accurate location of the cutting insert in the insert pocket and consequently that of the operative cutting edge, will be dependent on the degree of flatness of the surfaces of the cutting insert.

One approach used to solving the problem of the accurate determination of the location of the operative cutting edge is to grind the insert surfaces. Another approach used is to design the insert pocket with three support points on the base support wall, two support points on one of the two adjacent side support walls and one support point on the other one of the two adjacent side support walls. It will be appreciated by those skilled in the art that the use of the term "support point" does not imply a geometrical point having no dimension, but rather a physical point which will have a small area, the size of which is to be determined by the accuracy required.

Yet another approach used is to design the insert so that the support points are provided on the insert surfaces, instead of on the support walls of the insert pocket. This approach is particularly attractive because it is more cost effective than the other approaches. On the one hand, it does not require grinding of the insert surfaces and on the other hand it requires less machining operations when producing the insert pocket. In applying the third approach two methods have generally been used. In one method, flat and coplanar support surfaces are used, see for example U.S. Pat. No. 5,441,370, and in the other rounded projections are used, see for example U.S. Pat. No. 6,126,366. The former has a disadvantage in that the support surfaces still require a high degree of surface flatness in order to well define the location of the operative cutting edge. The latter has a disadvantage in that the rounded projections form, what is referred to in the art as, undercuts. This means that the latter can only be produced with split die tool sets.

It is an object of the present invention to provide a cutting insert with a support arrangement, with a view to the elimination of the above-mentioned disadvantages, so that when the cutting insert is mounted in a cutting tool, it will be statically retained by a well defined three-point support arrangement and have an accurately located operative cutting edge.

SUMMARY OF THE INVENTION

In accordance with the present invention there is provided a replaceable cutting insert for use in a cutting tool comprising:

a top surface, a bottom surface and a plurality of side surfaces extending between the bottom and top surfaces, each side surface intersecting with the top surface at a top edge at least a section of which constitutes a cutting edge;

a plurality of corner side surfaces, each side surface extending between a first corner side surface and a second corner side surface;

a recess in at least side surface, the recess being located below the top edge and having a first and second opposing side edges and an upper edge therebetween;

first and second minor side surfaces adjacent each recess, at least a portion of the first minor side surface extending from the first side edge to the first corner side surface, and at least a portion of the second minor side surface extending from the second side edge to the second corner side surface, wherein the at least a portion of the first minor side surface and the at least a portion of the second minor side surface are flat and non-coplanar, and wherein the at least a portion of the first minor side surface extends outwardly from the first corner side surface to the first side edge and the at least a portion of the second minor side surface slope outwardly from the second corner side surface to the second side edge.

In accordance with a preferred embodiment of the present invention, the first and second minor side surfaces each have a portion bordering on the upper edge of the recess.

Further in accordance with a preferred embodiment of the present invention, the first and second minor side surfaces slope outwardly from the bottom surface toward the top surface.

Further in accordance with a preferred embodiment of the present invention, the first and second minor side surfaces are identical.

In accordance with a preferred embodiment of the present invention, the cutting insert has four side surfaces.

Further, in accordance with a preferred embodiment of the present invention, the each of the four side surfaces is provided with a recess.

In accordance with a specific application of the present invention, the side surfaces of the plurality of side surfaces are identical.

If desired, the first and second minor support surfaces are ground.

The is also provided in accordance with the present invention, a cutting tool having an insert pocket with the cutting insert in accordance with the present invention retained therein, wherein the insert pocket comprises a base wall, and adjacent rear and side walls extending generally upwardly from the base wall, the rear and side walls being provided with rear and side contact edges, respectively, one of the rear or side contact edge abutting the cutting insert at first and second abutments points located on the first and second side edges, respectively, of the recess in the at least one side surface of the cutting insert.

In accordance with a preferred embodiment of the present invention, the cutting insert has four side surfaces.

Further, in accordance with a preferred embodiment of the present invention, the each of the four side surfaces is provided with a recess and the rear contact edge abuts the cutting insert at first and second abutments points located on the first and second side edges, respectively, of one side surface and the side contact edge abuts the cutting insert at a third abutment point located on the first side edge of an adjacent side surface.

It will be appreciated, that in accordance with this preferred embodiment the cutting insert is retained in the insert pocket by a three-point support arrangement.

In accordance with a specific application of the present invention, the side surfaces of the plurality of side surfaces are identical.

In accordance with a preferred embodiment of the present invention, the first and second minor side surfaces each have a portion bordering on the upper edge of the recess.

Further in accordance with a preferred embodiment of the present invention, the first and second minor side surfaces slope outwardly from the bottom surface toward the top surface.

If desired, the first and second minor support surfaces are ground.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
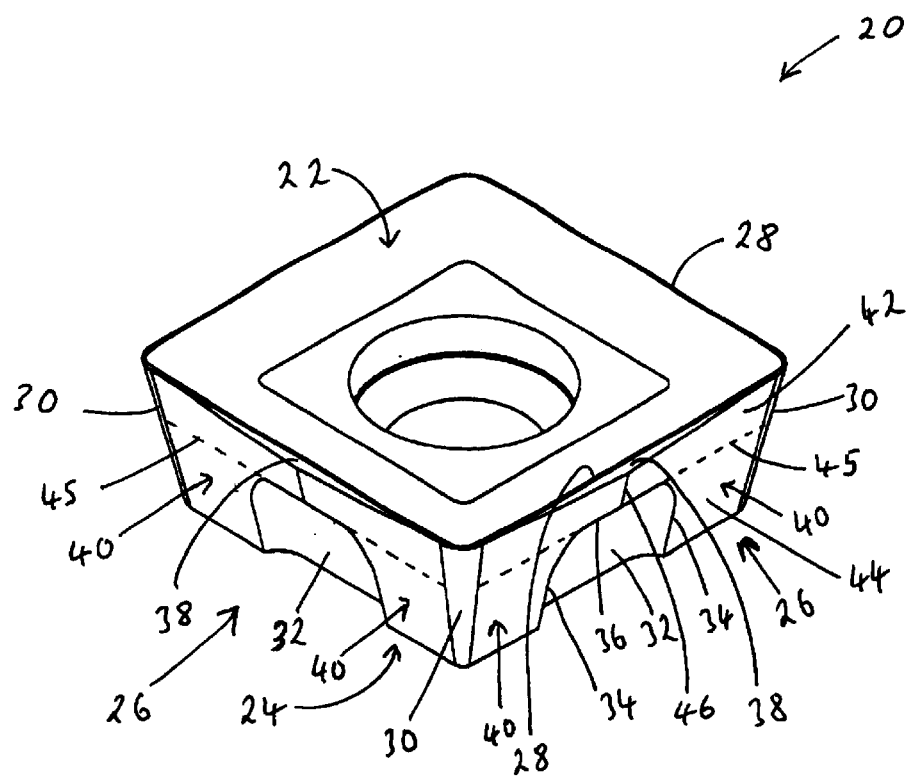
FIG. 1 is a perspective view of a first embodiment of a cutting insert in accordance with the present invention.
Figure 2:
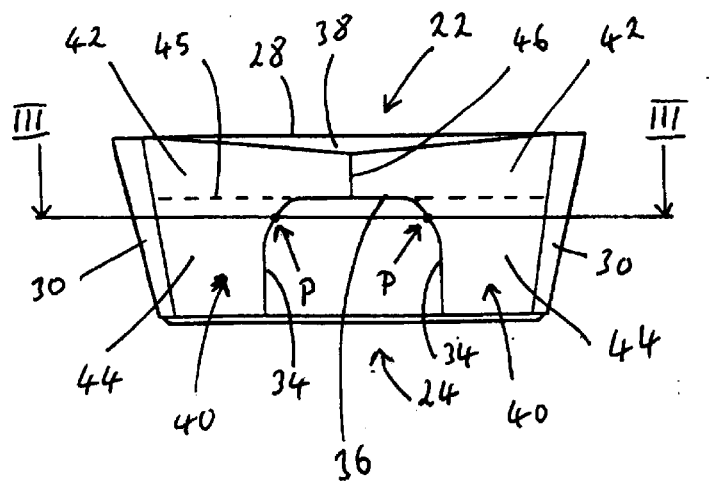
FIG. 2 is a side view of the cutting insert in FIG. 1.
Figure 3:
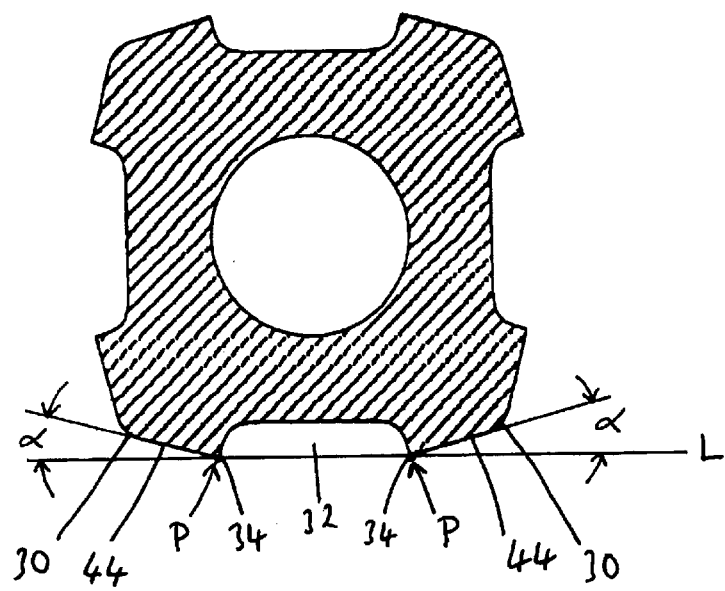
FIG. 3 is a cross-sectional view of the cutting insert shown in FIGS. 1 and 2 taken along the line III—III in FIG. 2.

Referring now to the drawings, there is shown in FIGS. 1 to 3 a replaceable indexable cutting insert 20 according to a first embodiment of the present invention. The cutting insert 20 has a generally square shape with a top surface 22, a bottom surface 24 and four substantially identical side surfaces 26 extending between the top surface 22 and bottom surface 24. Each side surface 26 intersects the top surface 22 at a top edge 28. The present invention is concerned with the support of the cutting insert 20 in a cutting tool and not with the particular shape of the cutting edge. Therefore, the form of the cutting edge will not be described and it will only be pointed that at least a section of the top edge 28 constitutes a cutting edge. The cutting insert 20 has four corner side surfaces 30 with each side surface 26 extending between two corner side surfaces 30.

Since the four side surfaces 26 are substantially equal, the structure of the side surfaces 26 will be described with respect to one side surface only, it being understood that the described structure applies to all four side surfaces 26. Therefore, with reference to a particular side surface, the side surface 26 is provided with a recess 32. The recess 32 is located below the top edge 28, that is, it does not intersect the top edge 28. The recess 32 is generally centrally located in the side surface 26 with respect to the corner side surfaces 30. The recess 32 has a boundary edge in the side surface 26 defined by two opposing side edges 34 and an upper edge 36 connecting the side edges 34. The side surface 26 is provided with a relief surface 38 adjacent the top edge 28. The remainder of the side edge 26, between the relief surface 38 and the bottom surface 24 is divided into two planar, or flat, minor side surfaces 40. By planar, or flat, is meant as flat as possibly obtainable taking into account manufacturing tolerances. Therefore, in general if the cutting inserts of the present invention are manufactured by pressing and sintering only, then it is to be expected that the minor side surfaces 40 will be less flat than if these surfaces were to be ground after pressing and sintering.

Each minor side surface 40 is divided into an upper portion 42, adjacent the relief surface 38, and a lower portion 44 extending from the upper portion 42 to the bottom surface 24. The upper and lower portions are separated by an imaginary line represented by the dashed line 45. The upper and lower portions 42, 44 of a given minor side surface 40 lie in the same plane since the given minor side surface 40 is flat. The upper portions 42 extend outwardly from respective corner side surfaces 30 and meet at a centrally located joint 46, situated between the relief surface 38 and the recess 32. Each lower portion 44 extends outwardly from a respective corner side surface 30 to a respective side edge 34 of the recess 32. As shown in FIG. 2 the cross-section shown in FIG. 3 is taken along the line III—III that cuts the side edges 34 on either side of the recess at points P. In FIG. 3 a line L, which coincides with the line III—III of FIG. 2, is drawn through the two points P. As can be seen, each minor side surface 40 (and therefore equivalently each corresponding upper and lower portion 42, 44) slopes outwardly from an associated corner side surface 30 to the an associated side edge 34, making an acute angle $\alpha$ with the line L. The value of the angle $\alpha$ depends on the design of the cutting insert 20. In a non-binding example $\alpha$=0.6°. As will be described in greater detail below with respect to the retaining of the cutting insert 20 in an insert pocket in a cutting tool, the points P represent abutment point between the cutting insert 20 and the insert pocket.

In accordance with the embodiment described above, each minor side surface 40 has a portion, namely the upper portion 42, bordering on the upper edge of the recess 36. Furthermore, as can be seen in FIG. 2, the minor side surfaces 40 slope outwardly from the bottom surface 24 toward the top surface 22. Also, the two minor side surfaces 40 of each side surface 26 are identical.

Figure 4:
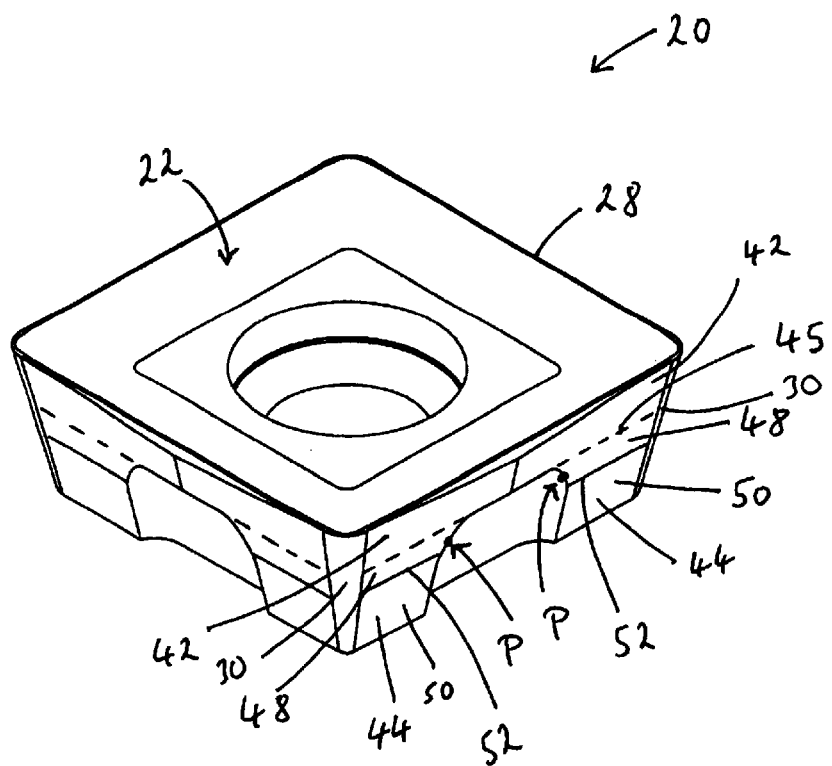
FIG. 4 is a perspective view of a second embodiment of a cutting insert in accordance with the present invention.

Attention is now drawn to FIG. 4, showing a cutting insert 20 in accordance with a second embodiment of the present invention. In accordance with this embodiment, each lower portion 44 is divided into two sub-portions, an upper sub-portion 48 and a lower sub-portion 50. The two sub-portions 48, 50 meeting at a sub-portion joint 52. The upper portions 42, in accordance with the second embodiment, have the same properties as those of the upper portion 42 of the first embodiment. That is, the upper portions 42 extend outwardly from respective corner side surfaces 30 and meet at a centrally located joint 46, situated between the relief surface 38 and the recess 32. The upper sub-portions 48, in accordance with the second embodiment, have the same properties as those of the lower portions 44 of the first embodiment. That is, each upper sub-portion 48 extends outwardly from a respective corner side surface 30 to a respective side edge 34 of the recess 32. Therefore, if a cross-section where taken through the upper sub-portions 48, the result would be a cross section having the form shown in FIG. 3. Clearly, the two upper sub-portions 48 of each side surface 26 are flat and non-coplanar. In accordance with the second embodiment, the abutment points P will be on the side edges 34 adjacent the upper sub-portions 48. In contrast to the first embodiment, the lower sub-portions 50 can have any desired geometry and are not required to be flat, or flat and non-coplanar.

Figure 5:
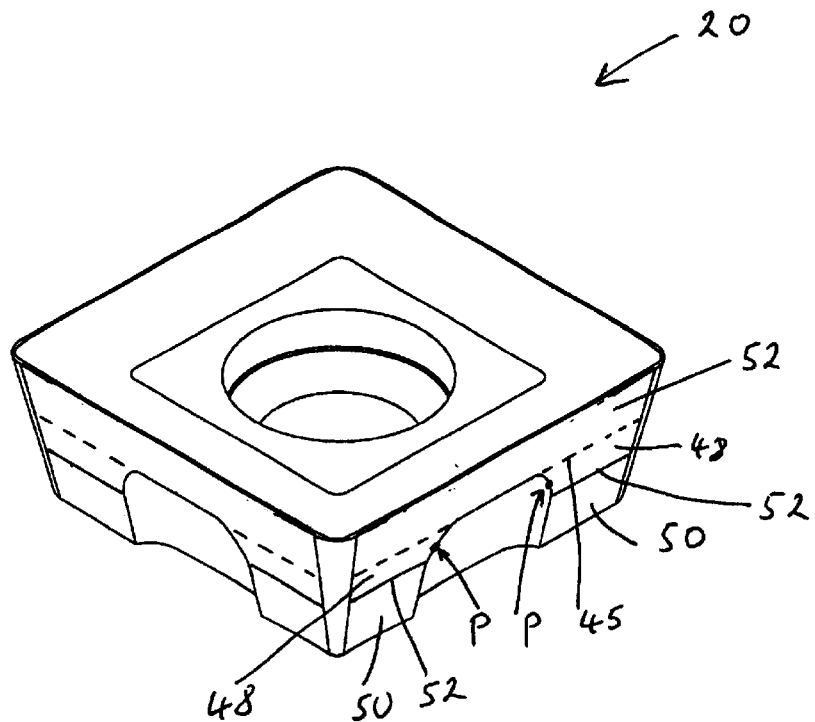
FIG. 5 is a perspective view of a third embodiment of a cutting insert in accordance with the present invention.

Attention is now drawn to FIG. 5, showing the cutting insert 20 in accordance with a third embodiment of the present invention. In accordance with this embodiment, the cutting insert 20 has upper and lower sub-portions 48, 50 having the same properties as those of the second embodiment. However, each side surface 26 of the cutting insert in accordance with the third embodiment has a relief surface 52, adjacent the top edge 28 and that extends to the upper sub-portions 48 and to the upper edge 36, that can have any desired geometry.

Figure 6:
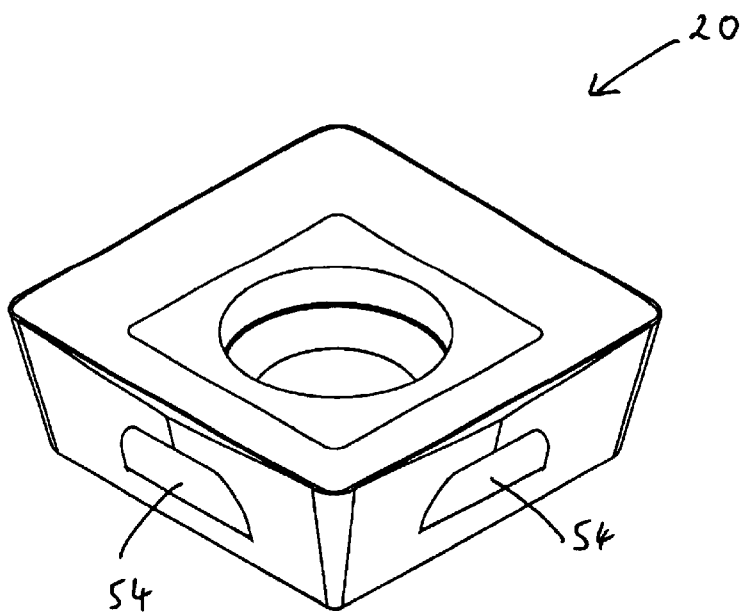
FIG. 6 is a perspective view of a cutting insert with an alternative form of recess.
Figure 7:
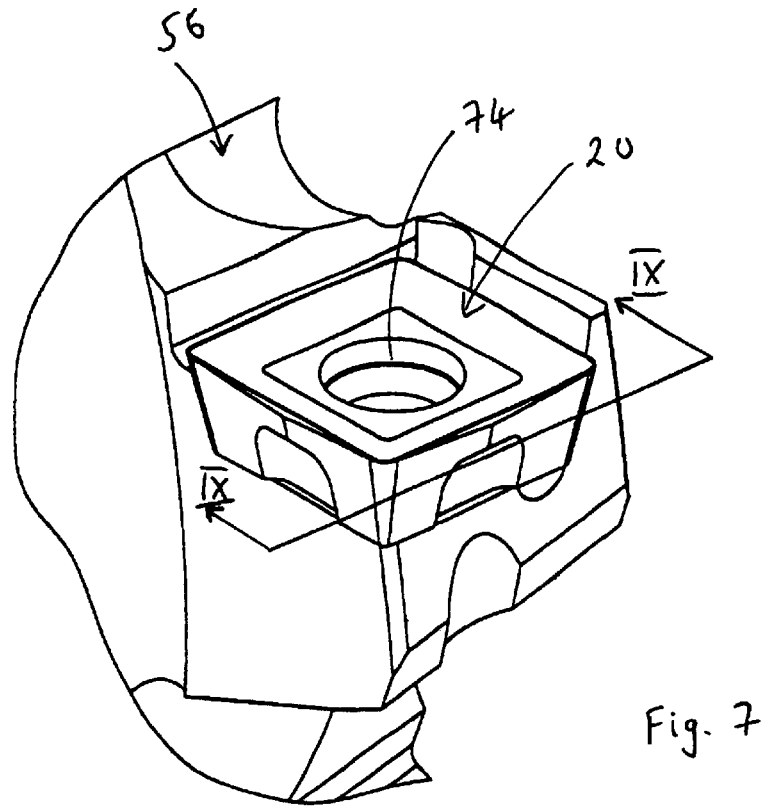
FIG. 7 is a perspective view of an insert pocket of a cutting tool with a cutting insert in accordance with the present invention retained therein.
Figure 8:
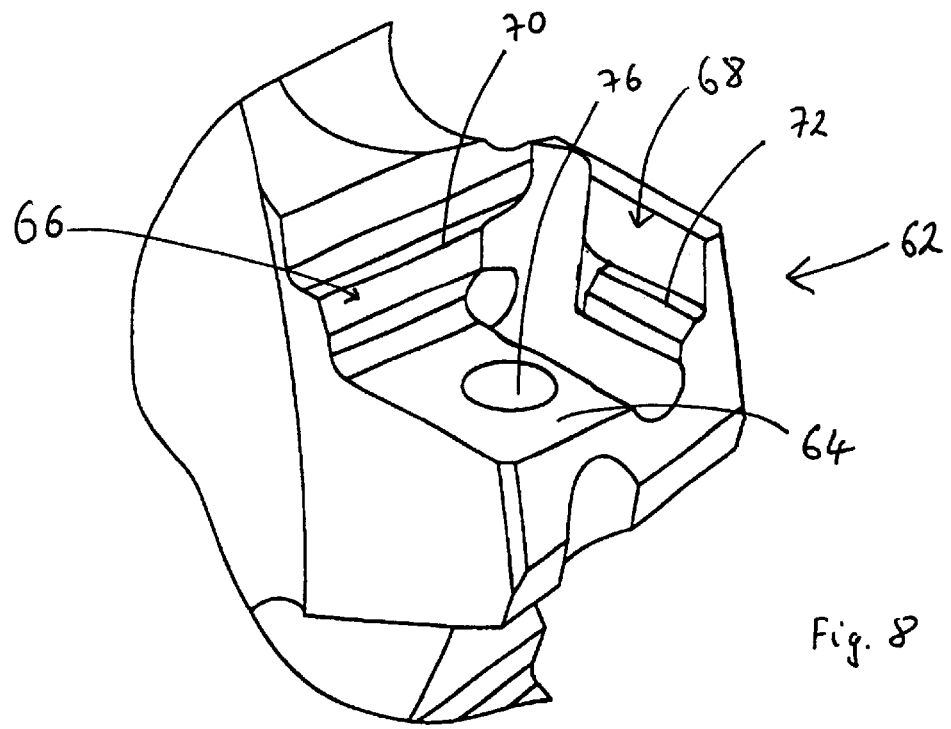
FIG. 8 is a perspective view of an insert pocket of a cutting tool for retaining a cutting insert in accordance with the present invention.
Figure 9:
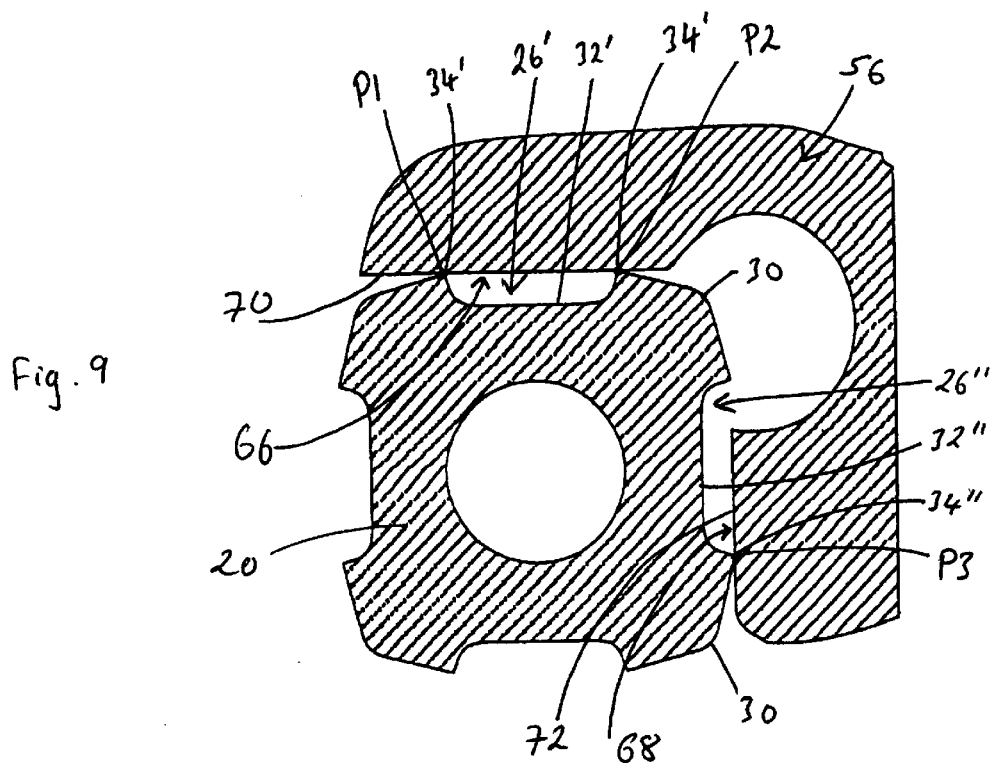
FIG. 9 is a partial cross-sectional view of the insert pocket with the cutting insert retained therein as shown in FIG. 7 taken along the line IX—IX.
Figure 10:
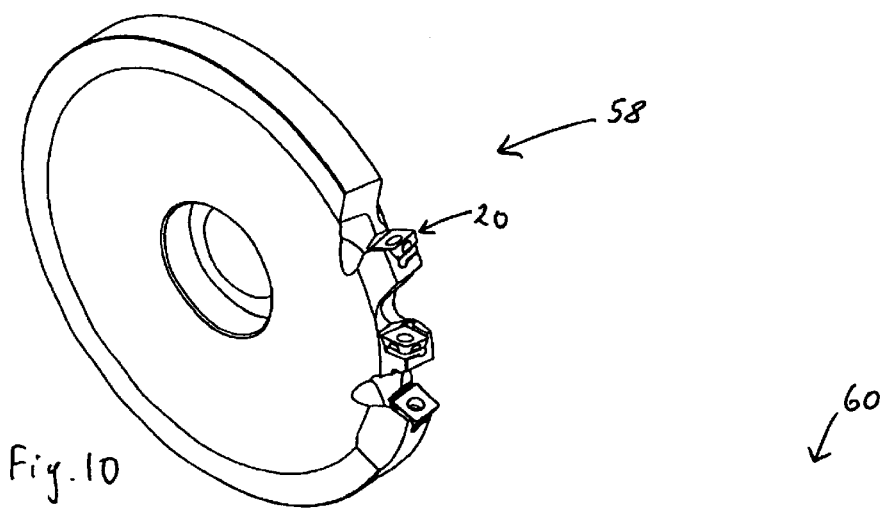
FIG. 10 is slotting cutter in which are seated cutting inserts in accordance with the present invention.
Figure 11:
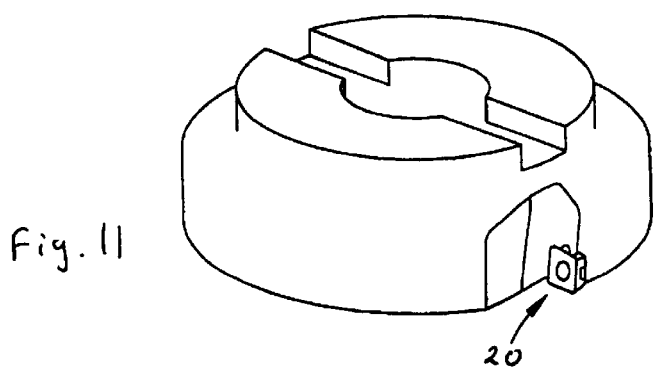
FIG. 11 is face-milling cutter in which are seated cutting inserts in accordance with the present invention.

In the three embodiments of the cutting insert 20 described above, the recess 32 extends to the bottom surface 24. In FIG. 6, there is shown a closed recess 54 which can be used as an alternative form of recess in the present invention. The closed recess 54 does not extent to the bottom surface 24. Clearly, the closed recess 54 can be used with any one of the three embodiments of the cutting insert 20 described above.

Attention is now drawn to FIGS. 7 to 11. A cutting tool 56, such as a slotting cutter 58, or a face mill 60 has insert pockets 62 in which cutting inserts 20 in accordance with the present invention are retained. Each insert pocket 62 comprises a base wall 64, and adjacent rear and side walls 66, 68 extending generally upwardly from the base wall 64. The rear and side walls 66, 68 are provided with rear and side contact edges 70, 72, respectively. With the cutting insert 20 retained in the insert pocket 62 (see FIGS. 8 and 9) the rear contact edge 70 abuts the cutting insert 20 at first and second abutments points P1, P2 located on the side edges 34' of the recess 32' of the side surface 26' adjacent the rear wall 66 and the side contact edge 72 abuts the cutting insert 20 at a third abutment point P3 located on one side edge 34" of the recess 32" of the side surface 26" adjacent the side wall 68.

No reference has been made herein to the method used for securing the cutting insert 20 in the insert pocket 62, since this is not a feature of the present invention. In the drawings, a through bore 74 is shown in the cutting insert 20 and a threaded bore 76 is shown in the base wall 64 of the insert pocket 62. It will be appreciated by those skilled in the art that these bores are fore receiving a screw for securing the cutting insert 20 in the insert pocket 62. It will further be appreciated that other securing arrangements can be used such as clamps, levers and pins.

Although the present invention has been described to a certain degree of particularity, it should be understood that various alterations and modifications can be made without departing from the spirit or scope of the invention as hereinafter claimed. For example, it will be appreciated that whereas reference has been made to cemented carbide inserts, the present invention is equally applicable to ceramic inserts. It will further be appreciated that the present invention is not restricted to cutting inserts having a generally square shape as shown in the figures. The support arrangement provided to the cutting insert by having a recess in the side surfaces with flat and non-coplanar surface portions on either side of the recess, can equally well be applied to rectangular, triangular and generally polygonal shaped inserts.

What is claimed:

1. A replaceable cutting insert for use in a cutting tool comprising:

a top surface, a bottom surface and a plurality of side surfaces extending between the bottom and top surfaces, each side surface intersecting with the top surface at a top edge at least a section of which constitutes a cutting edge;

a plurality of corner side surfaces, each side surface extending between a first corner side surface and a second corner side surface;

a recess in at least one side surface, the recess being located below the top edge and having first and second opposing side edges and an upper edge therebetween;

first and second minor side surfaces adjacent the recess, at least a portion of the first minor side surface extending from the first side edge to the first corner side surface, and at least a portion of the second minor side surface extending from the second side edge to the second corner side surface, wherein the at least a portion of the first minor side surface and the at least a portion of the second minor side surface are flat and non-coplanar, and wherein the at least a portion of the first minor side surface extends outwardly from the first corner side surface to the first side edge and the at least a portion of the second minor side surface slopes outwardly from the second corner side surface to the second side edge.

2. The cutting insert according to claim 1, wherein the first and second minor side surfaces each have a portion bordering on the upper edge of the recess.

3. The cutting insert according to claim 1, wherein the first and second minor side surfaces slope outwardly from the bottom surface toward the top surface.

4. The cutting insert according to claim 1, wherein the first and second minor side surfaces are identical.

5. The cutting insert according to claim 1, wherein the cutting insert has four side surfaces.

6. The cutting insert according to claim 5, wherein the each of the four side surfaces is provided with a recess.

7. The cutting insert according to claim 1, wherein the side surfaces of the plurality of side surfaces are identical.

8. The cutting insert according to claim 1, wherein the first and second minor support surfaces are ground.

9. A cutting tool having an insert pocket with the cutting insert in accordance with claim 1 retained therein, wherein the insert pocket comprises a base wall, and adjacent rear and side walls extending generally upwardly from the base wall, the rear and side walls being provided with rear and side contact edges, respectively, one of the rear or side contact edge abutting the cutting insert at first and second abutments points located on the first and second side edges, respectively, of the recess in the at least one side surface of the cutting insert.

10. The cutting tool according to claim 9, wherein the cutting insert has four side surfaces.

11. The cutting tool according to claim 10, wherein the each of the four side surfaces is provided with a recess and the rear contact edge abuts the cutting insert at first and second abutments points located on the first and second side edges, respectively, of one side surface and the side contact edge abuts the cutting insert at a third abutment point located on the first side edge of an adjacent side surface.

12. The cutting tool according to claim 9, wherein the side surfaces of the plurality of side surfaces are identical.

13. The cutting tool according to claim 9, wherein the first and second minor side surfaces each have a portion bordering on the upper edge of the recess.

14. The cutting tool according to claim 9, wherein the first and second minor side surfaces slope outwardly from the bottom surface toward the top surface.

15. The cutting tool according to claim 9, wherein the first and second minor support surfaces are ground.

16. A cutting tool comprising:

at least one insert pocket; and a cutting insert seated in the at least one insert pocket, the cutting insert comprising:

a top surface, a bottom surface and a plurality of side surfaces extending between the bottom and top surfaces, each side surface intersecting with the top surface at a top edge at least a section of which constitutes a cutting edge;

a plurality of corner side surfaces, each side surface extending between a first corner side surface and a second corner side surface;

a recess in at least one side surface, the recess being located below the top edge and having first and second opposing side edges and an upper edge therebetween;

first and second minor side surfaces adjacent the recess, at least a portion of the first minor side surface extending from the first side edge to the first corner side surface, and at least a portion of the second minor side surface extending from the second side edge to the second corner side surface, wherein the at least a portion of the first minor side surface and the at least a portion of the second minor side surface are flat and non-coplanar, and wherein the at least a portion of the first minor side surface extends outwardly from the first corner side surface to the first side edge and the at least a portion of the second minor side surface slopes outwardly from the second corner side surface to the second side edge.

17. The cutting tool according to claim 16, wherein the insert pocket comprises a base wall, and adjacent rear and side walls extending generally upwardly from the base wall, the rear and side walls being provided with rear and side contact edges, respectively, one of the rear or side contact edge abutting the cutting insert at first and second abutments points located on the first and second side edges, respectively, of the recess in the at least one side surface of the cutting insert.

18. The cutting tool according to claim 16, wherein the cutting insert has four side surfaces.

19. The cutting tool according to claim 18, wherein the each of the four side surfaces is provided with a recess and the rear contact edge abuts the cutting insert at first and second abutments points located on the first and second side edges, respectively, of one side surface and the side contact edge abuts the cutting insert at a third abutment point located on the first side edge of an adjacent side surface.

20. The cutting tool according to claim 16, wherein the side surfaces of the plurality of side surfaces are identical.

21. The cutting tool according to claim 16, wherein the first and second minor side surfaces each have a portion bordering on the upper edge of the recess.

22. The cutting tool according to claim 16, wherein the first and second minor side surfaces slope outwardly from the bottom surface toward the top surface.

23. The cutting tool according to claim 16, wherein the first and second minor support surfaces are ground.

* * * * *